April 18, 1967  R. P. GLOWIAK  3,314,529
TAB STRUCTURE
Filed June 15, 1965
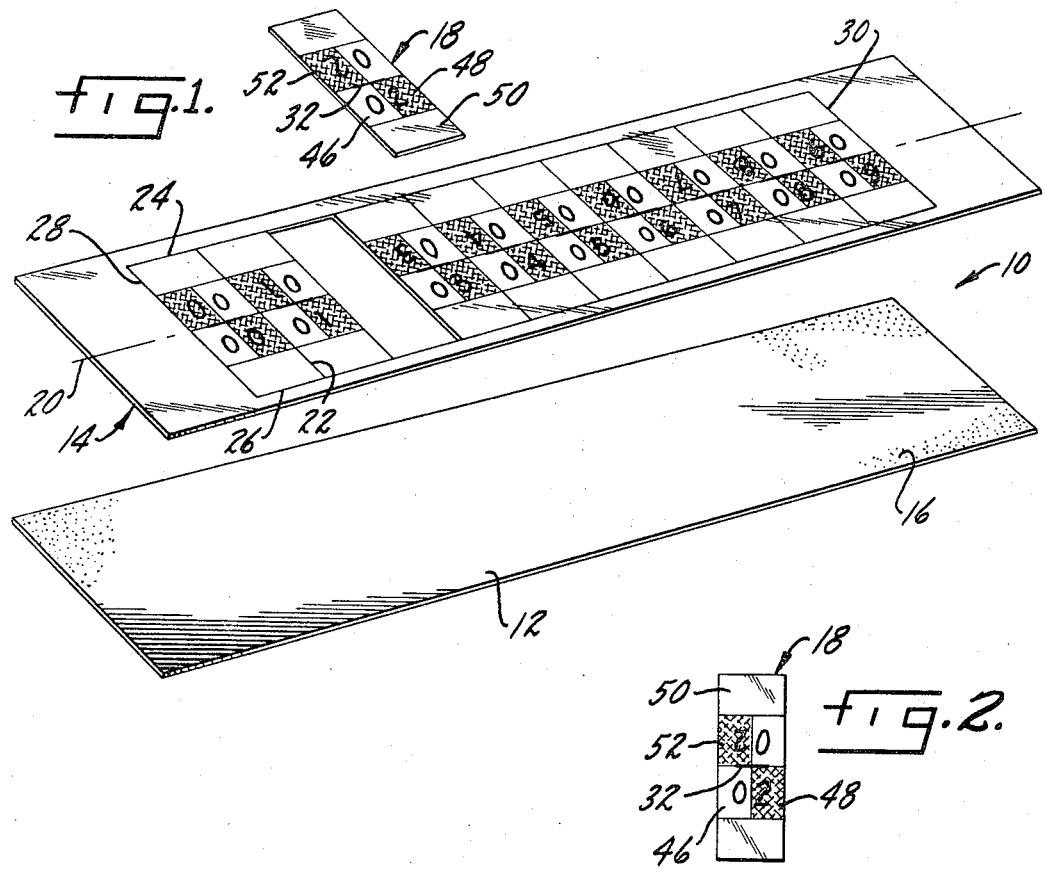
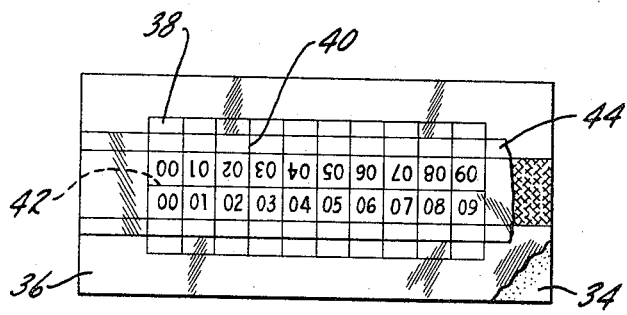
INVENTOR.
Raymond P. Glowiak,
BY Parker & Carter
Attorneys.

United States Patent Office 3,314,529
Patented Apr. 18, 1967

3,314,529
TAB STRUCTURE
Raymond P. Glowiak, 723 S. Wells St.,
Chicago, Ill. 60607
Filed June 15, 1965, Ser. No. 464,110
6 Claims. (Cl. 206—56)

This application is a continuation-in-part of my co-pending application Ser. No. 158,932, filed Dec. 4, 1961, now Patent No. 3,191,767, and Ser. No. 21,190, filed Apr. 11, 1960, now abandoned.

This invention relates to card filing systems, and particularly to a tab forming structure for use in quickly and efficiently converting a conventional card filling system to a key number system.

In the standard index card system in use in thousands of offices today, the information is nearly always classified by a code system. Probably the two most common code systems are an alphabetical system and a numerical system, although numbers and letters may be combined of course for special purposes. To obtain information from a card classified on a numerical basis, such as a consecutive number system, substantially the following procedure must be followed:

The card containing the desired information must be located, removed, and the desired information transferred to or from it. The card must then be returned to its specified position in the system. In small loan offices, for example, in which filing is usually done on an account number basis, a filing clerk will pull from a card index file all of the account numbers which represent loans upon which a payment is due that day. Since in any consecutive span of numbers some accounts will be inactive, and therefore absent from the files, it is necessary for the file clerk to first locate the approximate position in the consecutively-numbered series and then move either forward or backward until the exact card is located. Because of the absence of some cards, the account number on each card must be checked when the account number is being approached to insure that the correct card is obtained. This is a time-consuming procedure because the body of the card must be checked, and it requires some manual dexterity.

At the end of the day, after the loanee has made his payment and the information has been entered on the card, the file clerk must repeat the above-described procedure. That is, the exact position of each card in the file must be located and the card filed in its proper position. This is extremely important because a lost card would be almost the equivalent of a discharged account. To return each individual card, the file clerk must thumb through a series of cards to be sure that the returning card drops into its proper place.

There are several presently-known methods of converting the above-described type of index card filing system to a tab-type system. Generally they are unsatisfactory, however, because the time and labor involved in making the change is quite out of proportion to the benefit derived. In addition, in many conversion systems the type of tab used has been such as to obscure or, in fact, cover up pertinent information printed near the top of the card. Even when the conversion is completed, however, little has been accomplished other than to elevate the basic account number which merely reduces the manual dexterity required. The problems of placement and replacement of the cards in proper order, along with the mental effort involved in these operations, remains.

A primary purpose of this invention is a means for quickly and inexpensively converting conventional index card filing systems to an easy-to-use key number system.

Another purpose is a key number index card filing system of the type shown in co-pending application Ser. No. 158,932 now Patent 3,191,767 having improved tab forming structures.

Another purpose is a key number index system of the type described in which the tab forming structures are slit so that they may be more easily folded into substantially equal halves.

Another purpose is an improved key number index filing system utilizing a multiple tab forming structure.

Other purposes will appear in the ensuing specification, drawings and claims.

The invention is illustrated diagrammatically in the following drawings wherein:

FIGURE 1 is an exploded perspective view of a multiple tab forming unit,

FIGURE 2 is an enlarged plan view of one of the tab forming structures in the unit of FIGURE 1, and FIGURE 3 is a top plan view of a modified form of tab forming structure.

An index card converter which includes a plurality of tab forming structures is indicated generally at 10 in FIGURE 1. The converter consists essentially of a flexible backer sheet 12 of any suitable material, such as kraft paper. As shown in the drawings, the length of the sheet is substantially longer than its thickness. A facing or tab sheet is indicated generally at 14. This sheet may be composed of any suitable transparent material, such as cellulose acetate, also known simply as "acetate." The material is so cut as to be of the same size and shape as the backing sheet 12. Although any suitable materials may be used for either the backing sheet or the tab sheet, I have discovered that the backing sheet, which functions as a carrier means for the tab sheet 14 and the tab forming structure carried within the tab sheet, may advantageously be a kraft paper on the order of .003 inch thick, and the tab forming sheet a cellulose acetate film on the order of .005 inch thick. In any event, the tab forming sheet should be substantially harder than the backing sheet, although this is not necessary in every application. The two sheets are secured one to another by a conventional pressure sensitive adhesive generally indicated at 16 and normally formed on the backing sheet 12. As illustrated, the adhesive is shown in contact with the backing sheet 12, but it is immaterial to which of the opposing faces of the backing sheet and the tab forming sheet it is applied, so long as it is removable with the punched areas of the tab sheet.

Various pressure sensitive adhesives are suitable, and such adhesives are well known in the art. Included in such groups as representative adhesives are rubber adhesives which are formed by blending rubber as a latex or in solution form with natural resins such as rosin or rosin esters. The term "pressure sensitive adhesive" is recognized in the art and may be stated herein to mean an adhesive mass which is made to adhere upon application of pressure and is separated from adherence by a pulling force. Such adhesive masses are commonly found on cellophane and other tapes.

A plurality of punched tab areas are indicated at 18. Each tab area, of which in this instance there are ten, is aligned one with another along the converter and each is of substantially identical configuration. In this instance, each punched area is symmetrical about a line of symmetry or centerline 20. Any suitable means of punching the tab areas in the acetate facing sheet may be utilized, so long as the backing sheet is not cut through.

Each of the individual tab forming structures or punched tab areas 18 are separated from adjacent tab forming areas by cut lines 22. There are further cut lines 24 and 26 which separate the transverse ends of each of the tab forming structures from the acetate sheet. In like manner, there are cut lines 28 and 30 at the opposite ends of the sheet 10 which separate the end tab forming structures, in this case those designated as 0 and 9, from the sheet itself.

In the illustrated embodiment the tab forming structures are spaced from one another only by the thickness of a cut line, and the edges may actually be in contact with one another. For a given length in the direction of centerline 20 this enables the maximum number of tab structures to be formed. It will be appreciated however that the tab forming structures may be spaced from one another a greater distance if desired, as for example to present a more esthetically pleasing appearance, or when space considerations in the direction of centerline 20 are not critical.

Of importance in the structure shown in FIGURES 1 and 2 is that there is a generally central slit 32 which extends partially along the center line of each tab forming structure 18. As can be seen from the drawings, the tab forming structures are arranged in generally symmetrical and substantially identical halves. These halves are adapted to be folded over when applied to an index card and the slit 32 is advantageous in facilitating the folding of the tab about the center or fold line 20 so that an area of self adhesion at the top of the folded, multi-layered tab structure is provided. Note particularly that the slits of the tab forming structures do not extend completely through each structure, rather they extend along a portion of the centerline. It is preferred that the slit portion be generally centrally or medially spaced within each tab forming structure and it is also advantageous that the length of the slit 32 be generally equal to one-half of the total width of each tab forming structure. Stated another way, the unslit portions at each end or each edge of each tab forming structure, combined, generally equal the length of each slit 32. As will be apparent from both FIGURES 1 and 2, the opposed severed edges which form the slit lie in substantially abutting engagement with one another.

FIGURE 3 illustrates a modified form of tab forming structure. In this case a backing sheet 34, which may be similar to the backing sheet 12, underlies an acetate sheet 36, which again may be of any suitable acetate material. Individual tab forming structures 38 are formed in the acetate sheet 36 with each tab forming structure 38 being adjacent the other tab forming structures and being separated by cut lines 40. There is a slit 42 which extends completely along the centerline of the acetate sheet to divide each of the tab forming structures into generally equally sized and shaped halves. In order to hold the two halves together a layer of Mylar or some similar plastic, indicated at 44, may be applied by a suitable transparent pressure sensitive adhesive to a portion of the area of each tab forming structure 38. In this embodiment of the invention, the slit extends completely along the centerline and divides each tab forming structure into two pieces. The Mylar layer holds the two pieces together. Again, the slit primarily is to provide ease in folding the tab forming structure into identical halves for application to an index card.

The principal difference between the form shown in FIGURE 3 and the form shown in FIGURES 1 and 2 is that in FIGURE 3 the slits extend completely through each tab forming structure and divide it into two parts. The Mylar or similar plastic which overlies each part is used to hold the tab forming structure together. Mylar is more readily folded than the acetate material of which the tab forming structures are made.

The upper face of the tab sheet, in all forms of the invention, has suitable indicia printed thereon. This indicia is color coded from one sheet to the next, and there are consecutive numbers from 0 through 9 on each particular sheet. Although the color coding is not shown herein, it is utilized in practicing the invention. Reference is made to the above-mentioned co-pending application. For example, the color coding will identify different groups of numbers and there will be numbers from 0 through 9 in each color coded group.

The color may be applied and the printing also by various means. In one application, a colored ink or coating of colored ink may be applied in any conventional manner to the surface of the tab forming structures. After the color is applied, the numbers may be printed on in black ink.

It will be noted that there are two numbers on each tab forming structure. One of these numbers, referring to the form of FIGURES 1 and 2, is in an uncolored section designated at 46, while the other number is in the colored section designated at 48. The number in the uncolored section keys the ten numbers on the sheet to a particular color. For example, with an 0 in section 46, the color may be orange. With a 1 in section 46, the color may be purple, etc., through ten different colors or as many different colors as is applicable. The numbers in the colored section 48 will be repetitive in that there will be numbers 0 through 9 on an orange sheet and numbers 0 through 9 on each of the other colored sheets. The colors key the most significant digit in each number.

Various ink and color compositions may be used to imprint the acetate. The selection will be influenced, in part, by the indicia material used. Different material may take or absorb different ink and color compositions to different degrees. It is only intended that a certain color or a true hue be retained on the particular material used. Offset printer's ink has been found useful with cellulose acetate material. It is further found that the softer the acetate, the more readily will colored ink be absorbed. Such relationship between the film and the ink can be easily ascertained by those skilled in the art.

The "softness" or "stiffness" of the acetate will, of course, be determined by the amount of plasticizer incorporated in the acetate. Plasticizers such as dimethyl phthalate, diethyl phthalate, di(methoxyethyl) phthalates and lower alkyl phthalyl ethyl glycolotes are well known. The use of such plasticizers to obtain various softness and stiffness of the acetate is also well known and determinable by recognized process steps.

The offset printer's ink which may be used for applying color to the acetate is preferably present as a composition containing a selected amount of an alkyd varnish which is a solution of an alkyd resin in a volatile solvent such as alcohol or turpentine. The greater the amount of the resin in the varnish, the slower will be the rate of drying after application. There is no critical amount of resin which will be continually optimum. Factors such as temperature, humidity and stiffness of the acetate will contribute to making a particular selection. The compounding of the ink composition will accordingly be determined with modest effort by a man of ordinary skill after considering such factors.

In utilizing the invention, the numbers will be removed from the acetate and individually applied to index cards. It is preferred that the numbers 9, these being the numbers in the colored section 48, be applied at the right-hand side of a card with the number 8 being applied in the next adjacent position at the top of the card, with successive numbers being applied in positions which are successively moved toward the left until the number 0 will be applied adjacent the left-hand side of the card. The tabs are removed from the acetate, folded over, and applied to the top of an index filing card with the transparent sections 50 being applied to the card such that the opaque or colored sections 52 will extend or stick up above the top of the card. The details of the application of these tab forming structures are illustrated in the above-mentioned copending application.

The use, operation and function of the invention are as follows:

To convert a conventional index card from its present classification system to the key number system of the present invention, the card is first removed from the index drawer. Assuming account number 2302 has been chosen, a converter is selected having the reference number "02" on it. Index tab "02" is then peeled off from the converter, and placed on the index card in such a manner that the transparent portions 50 adhere to the card and the opaque portions 52 extend above the card. The tab structure will be folded along the centerline with the slits facilitating the folding as described above.

Since there are ten numbers ending with the digits 02 between 2000 and 2999, ten card converters, each having the number 02, are needed to cover the range. There are also 10 numbers ending in the reference numerals 22 in the same range and so on up to reference numerals ending in 92. If every number in the given range is utilized, there would be a hundred cards out of the 1000 having tabs located in the number 2 position. By utilizing ten different colors, however, one for each different set of numbers whose last digit is 2, the possible choices in locating any particular number whose last digit is 2 is reduced to ten. Thus, if the 02 numbers are printed in a broken color, for example a broken orange, all ten of the numbers ending in reference numerals 02 can be easily spotted in the card drawer. In fact, with the use of only five different colors, 1000 numbers can be easily broken down into choice groups of ten by utilizing solid and broken colors. For purposes of description I will refer to a set as comprising ten converter cards, each having ten separate tab areas, each converter card carrying a reference number series of ten consecutive numbers, the series being consecutive.

Once an index card system has been converted to the color tab number system, the use of the system is tremendously facilitated. At the commencement of the day's operations in a small loan office for example, a file clerk may be told to pull a group of account number cards including account number 2302. The clerk merely looks at the last reference numeral and seeing that it is a 2, immediately directs his attention to the 2 column in the index card drawer. If the number 02 is designated by, say, a broken orange color, it is only necessary to pick out those cards carrying tabs in the second column which are one-half orange. At the end of the day, when the card is to be returned to its file, it is not necessary to refile it in any particular location. The card is merely placed at the front of the file and if it is needed a day or month or a year later, it can be quickly located by exactly the same process.

It is never necessary for the file clerk to read the index cards in returning the cards to the file, and it is only necessary to look at a maximum of ten cards in locating any particular card in the file. In small loan offices where the account cards are pulled permanently once the account is no longer active, there may only be 300 or 400 cards in the 1,000 number range of the illustrated example. Assuming that there were three active accounts whose last two digits are 02, it would then only be necessary to glance at a maximum of three cards, more probably only two and quite possibly just one. Since the three 02 cards would nearly always be widely separated, the correct card could easily be located by quickly flipping the cards. No laborious sorting of a run of physically adjacent cards would be necessary.

Whereas the preferred form of the invention has been shown and described herein, it should be realized that there are many modifications, substitutions and alterations thereto within the scope of the following claims.

What is claimed is:

1. A multiple tab unit, said unit including an elongated tab sheet in which are formed, between its ends,
a plurality of discrete tab forming structures, bounded by peripherally continuous cut lines, and removably secured to
a unitary carrier sheet which maintains the tab forming structures in fixed relationship to one another between the ends of the carrier sheet,
each tab forming structure being secured only to the carrier sheet whereby any desired tab forming structure may be separated from the carrier independently of any other tab forming structure, and the same relative positions of the remaining tab forming structures will be maintained between themselves with respect to the carrier sheet,
the width of the carrier sheet being greater than the length of a tab forming structure,
each of said tab forming structures having a first, transparent portion adapted to be secured to an edge of a receiving structure, and a second, relatively opaque portion capable of presenting identifying indicia,
each of said tab forming structures being divided by a centerline into generally equally sized halves, and a slit extending at least partially along each center line to facilitate folding of each tab structure along said centerline,
each slit extending completely along the centerline from one edge of each tab structure to the opposite edge, and
a transparent overlay covering at least a portion of each tab structure, there being a separate overlay for each tab structure.

2. The structure of claim 1 further characterized in that said overlays are formed of Mylar and each extends only partially over the area of a tab structure.

3. In a tab unit,
carrier means, and
a tab forming structure removably secured to the carrier means,
said tab forming structure including relatively stiff sheet material having adhesive on the surface which contacts the carrier means, said adhesive being removable with the relatively stiff sheet material from the carrier means,
said tab forming structure having a fold line about which it may be folded to thereby form a multi-layer structure,
means for forming an area of self adhesion at the top of the folded multi-layered tab structure,
said means comprising a slit extending completely through the tab forming structure,
said slit being substantially coincident with the fold line and substantially medially located with respect to the end portions of the tab which flank the fold line,
said slit having no nominal width whereby the opposed, severed edges which form the slit lie in substantially abutting engagement with one another,
the terminal edges of the slit being located inwardly of the side edges of the tab forming structure to thereby form connecting means for the portions of the tab forming structure which lie on either side of the fold line,
said slit extending a distance sufficient to present no resistance to folding of the tab forming structure along the fold line to thereby provide means for self adhering abutting adhesive surface portions of the tab structure.

4. The tab unit of claim 3 further characterized in that the opposite ends of the slit are substantially equally spaced from the adjacent flanking edges of the tab forming structure.

5. The tab unit of claim 3 further characterized in that each tab forming structure includes an indicia receiving portion and a clear, transparent portion, the latter of which substantially coincides with the attachment area which is adapted to be adhesively secured to the receiving structure.

6. In a multiple tab unit,
a carrier sheet,
a plurality of discrete tab forming structures,
said tab forming structures being removably secured to the carrier sheet to thereby maintain the tab forming structures in fixed relationship to one another between the ends of the carrier sheet,
each tab forming structure being secured to the carrier sheet whereby any desired tab forming structure may be separated from the carrier sheet independently of any other tab forming structure, and the same relative positions of the remaining tab forming structures will be maintained between themselves with respect to the carrier sheet,
each of said tab forming structures having a first transparent portion adapted to be secured to an edge of a receiving structure, and a second, relatively opaque portion capable of presenting identifying indicia,
each of said tab forming structures being divided by a centerline into generally equally sized halves, and a slit extending at least partially along each center line to facilitate folding of each tab structure along said centerline, and
a transparent overlay covering at least a portion of each tab structure,
said slit extending completely through thet tab forming structure and transparent overlay and being substantially coincident with the centerline and substantially medially located with respect to the end portions of the tab forming structure which flank the centerline,
said slit having no nominal width whereby the opposed, severed edges which form the slit lie in substantially abutting engagement with one another,
said slit extending a distance sufficient to present no resistance to folding of the tab forming structure along the centerline to thereby provide means for self adhering abutting adhesive surface portions of the tab forming structure.

References Cited by the Examiner
UNITED STATES PATENTS

| | | |
|---|---|---|
| 1,151,475 | 8/1915 | Kingsley et al. |
| 1,772,106 | 8/1930 | Miller. |
| 2,681,732 | 6/1954 | Brady. |
| 2,682,721 | 7/1954 | Harris _____ 40—2 |
| 3,001,306 | 9/1961 | Wilkinson. |
| 3,070,482 | 12/1962 | Cunningham. |
| 3,148,103 | 9/1964 | Gallagher _____ 220—23.8 |

THERON E. CONDON, *Primary Examiner.*

MARTHA L. RICE, LOUIS G. MANCENE,
*Examiners.*